(12) United States Patent
Brady et al.

(10) Patent No.: US 10,809,413 B2
(45) Date of Patent: Oct. 20, 2020

(54) FIBER OPTIC MAGNETO-RESPONSIVE SENSOR ASSEMBLY

(71) Applicant: SCHLUMBERGER TECHNOLOGY CORPORATION, Sugar Land, TX (US)

(72) Inventors: Dominic Brady, Dhahran (SA); Arthur H. Hartog, Winchester (GB)

(73) Assignee: Schlumberger Technology Corporation, Sugar Land, TX (US)

(*) Notice: Subject to any disclaimer, the term of this patent is extended or adjusted under 35 U.S.C. 154(b) by 577 days.

(21) Appl. No.: 15/507,292

(22) PCT Filed: Aug. 29, 2014

(86) PCT No.: PCT/US2014/053445
§ 371 (c)(1),
(2) Date: Feb. 28, 2017

(87) PCT Pub. No.: WO2016/032517
PCT Pub. Date: Mar. 3, 2016

(65) Prior Publication Data
US 2017/0248008 A1    Aug. 31, 2017

(51) Int. Cl.
*G01V 3/18* (2006.01)
*G01V 3/38* (2006.01)
(Continued)

(52) U.S. Cl.
CPC ............... *G01V 3/18* (2013.01); *E21B 47/09* (2013.01); *E21B 47/092* (2020.05);
(Continued)

(58) Field of Classification Search
CPC .... E21B 47/0905; E21B 47/09; E21B 47/123; E21B 49/00; E21B 2023/008;
(Continued)

(56) References Cited

U.S. PATENT DOCUMENTS 2,558,427 A    6/1951  Fagan
4,110,688 A    8/1978  Bailey
(Continued)

FOREIGN PATENT DOCUMENTS

DE    2818656 A1    10/1979
DE    29816469 U1   12/1998
(Continued)

OTHER PUBLICATIONS

International Search Report and Written Opinion issued in International Patent Appl. No. PCT/US2014/053445 dated May 19, 2015; 17 pages.
(Continued)

*Primary Examiner* — Que Tan Le
*Assistant Examiner* — Jennifer D Bennett
(74) *Attorney, Agent, or Firm* — Rodney Warfford

(57) ABSTRACT

A sensor assembly for passive detections of downhole well features. Embodiments include a casing collar locator assembly that utilizes fiber optics in combination with a magneto-responsive sensor to detect casing collars and provide real-time location information in a well. The sensor may be configured to work with a poled monolithic structure that is dimensionally responsive to voltage in a way that substantially eliminates noise during detections. Additionally, the sensor may be intentionally imbalanced, utilizing multiple fibers of different lengths and multiple wavelength monitoring so as to provide enhanced directional information as well as allow operators to decipher and address circumstances of polarization fade.

14 Claims, 7 Drawing Sheets

(51) Int. Cl.
*G01V 3/10* (2006.01)
*E21B 47/09* (2012.01)
*E21B 47/092* (2012.01)
*E21B 47/135* (2012.01)
*E21B 49/00* (2006.01)
*G01V 3/28* (2006.01)

(52) U.S. Cl.
CPC ............ *E21B 47/135* (2020.05); *E21B 49/00* (2013.01); *G01V 3/10* (2013.01); *G01V 3/28* (2013.01); *G01V 3/38* (2013.01)

(58) Field of Classification Search
CPC ....... E21B 47/092; E21B 47/135; G01V 3/28; G01V 3/10; G01V 3/38; G01V 3/18
See application file for complete search history.

(56) References Cited

U.S. PATENT DOCUMENTS

| | | | |
|---|---|---|---|
| 4,162,400 | A | 7/1979 | Pitts, Jr. |
| 4,353,122 | A | 10/1982 | Cubberly, Jr. |
| 4,378,497 | A | 3/1983 | Giallorenzi |
| 4,547,774 | A | 10/1985 | Gould |
| 4,568,933 | A | 2/1986 | McCracken et al. |
| 4,789,240 | A * | 12/1988 | Bush ................. G01D 5/266 356/477 |
| 4,794,336 | A | 12/1988 | Marlow et al. |
| 4,859,054 | A | 8/1989 | Harrison |
| 5,359,405 | A | 10/1994 | Andrews |
| 5,434,395 | A | 7/1995 | Storck et al. |
| 5,493,623 | A | 2/1996 | Frische et al. |
| 5,542,471 | A | 8/1996 | Dickinson |
| 5,573,225 | A | 11/1996 | Boyle et al. |
| 5,578,820 | A | 11/1996 | Gadeken et al. |
| 5,720,345 | A | 2/1998 | Price et al. |
| 5,808,779 | A | 9/1998 | Weis |
| 5,867,268 | A | 2/1999 | Gelikonov et al. |
| 5,986,749 | A | 11/1999 | Wu et al. |
| 6,009,216 | A | 12/1999 | Pruett et al. |
| 6,137,621 | A | 10/2000 | Wu |
| 6,192,983 | B1 | 2/2001 | Neuroth et al. |
| 6,233,746 | B1 | 5/2001 | Skinner |
| 6,305,227 | B1 | 10/2001 | Wu et al. |
| 6,305,467 | B1 | 10/2001 | Connell et al. |
| 6,314,056 | B1 | 11/2001 | Bunn et al. |
| 6,349,768 | B1 | 2/2002 | Leising |
| 6,419,014 | B1 | 7/2002 | Meek et al. |
| 6,474,152 | B1 | 11/2002 | Mullins et al. |
| 6,478,090 | B2 | 11/2002 | Deaton |
| 6,519,568 | B1 | 2/2003 | Harvey et al. |
| 6,531,694 | B2 | 3/2003 | Tubel et al. |
| 6,667,280 | B2 | 12/2003 | Chang et al. |
| 6,748,128 | B2 | 6/2004 | Koch et al. |
| 6,912,177 | B2 | 6/2005 | Smith |
| 7,077,200 | B1 | 7/2006 | Adnan et al. |
| 7,140,435 | B2 | 11/2006 | Defretin et al. |
| 7,208,855 | B1 | 4/2007 | Floyd |
| 7,308,941 | B2 | 12/2007 | Rolovic et al. |
| 7,408,645 | B2 | 8/2008 | DiFoggio |
| 7,413,011 | B1 | 8/2008 | Chee et al. |
| 7,420,475 | B2 | 9/2008 | Adnan et al. |
| 7,557,339 | B2 | 7/2009 | Poland et al. |
| 7,900,699 | B2 | 3/2011 | Ramos et al. |
| 8,004,421 | B2 | 8/2011 | Clark |
| 2003/0010495 | A1 | 1/2003 | Mendez et al. |
| 2004/0020635 | A1 | 2/2004 | Connell et al. |
| 2004/0084190 | A1 | 5/2004 | Hill et al. |
| 2004/0129418 | A1 | 7/2004 | Jee et al. |
| 2005/0012036 | A1 | 1/2005 | Tubel et al. |
| 2006/0102347 | A1 | 5/2006 | Smith |
| 2006/0157239 | A1 | 7/2006 | Ramos et al. |
| 2006/0185430 | A1 | 8/2006 | Yogeswaren |
| 2007/0044672 | A1 | 3/2007 | Smith |
| 2008/0066960 | A1 | 3/2008 | Mathiszik et al. |
| 2009/0058422 | A1 | 3/2009 | Tenghamn et al. |
| 2009/0078413 | A1 | 3/2009 | Tubel et al. |
| 2009/0250213 | A1 | 10/2009 | Kalb et al. |
| 2010/0309750 | A1 | 12/2010 | Brady |
| 2013/0056197 | A1 | 3/2013 | Maida et al. |
| 2014/0175271 | A1 * | 6/2014 | Samson ................. E21B 49/08 250/264 |

FOREIGN PATENT DOCUMENTS

| | | |
|---|---|---|
| EP | 0203249 A2 | 12/1986 |
| EP | 0853249 A1 | 7/1998 |
| EP | 1669769 A1 | 6/2006 |
| GB | 2177231 A | 1/1987 |
| GB | 2275953 A | 9/1994 |
| GB | 2299868 A | 10/1996 |
| WO | 2004020789 A2 | 3/2004 |

OTHER PUBLICATIONS

Maher et al., "A Fiber Optic Chemical Sensor for measurement of Groundwater pH", Journal of Testing and Evaluation, vol. 21, Issue 5, pp. 448-452, Sep. 1993.
Esteban et al., "Measurement of the Degree of Salinity of Water with a Fiber-Optic Sensor", Applied Optics, vol. 38, Issue 25, pp. 5267-5271, Sep. 1999.
Extended European Search Report issued in European Patent Application No. 10785835.9 dated Jun. 2, 2014; 12 pages.
Wolfbies et al., "Fiber Optic Fluorosensor for Oxygen and Carbon Dioxide", Analytical Chemistry, vol. 60, pp. 2028-2030, 1998.
International Search Report issued in International Patent Application No. PCT/IB2010/052549 dated Jan. 31, 2011; 3 pages.
Written Opinion issued in International Patent Application No. PCT/IB2010/052549 dated Jan. 31, 2011; 5 pages.

* cited by examiner

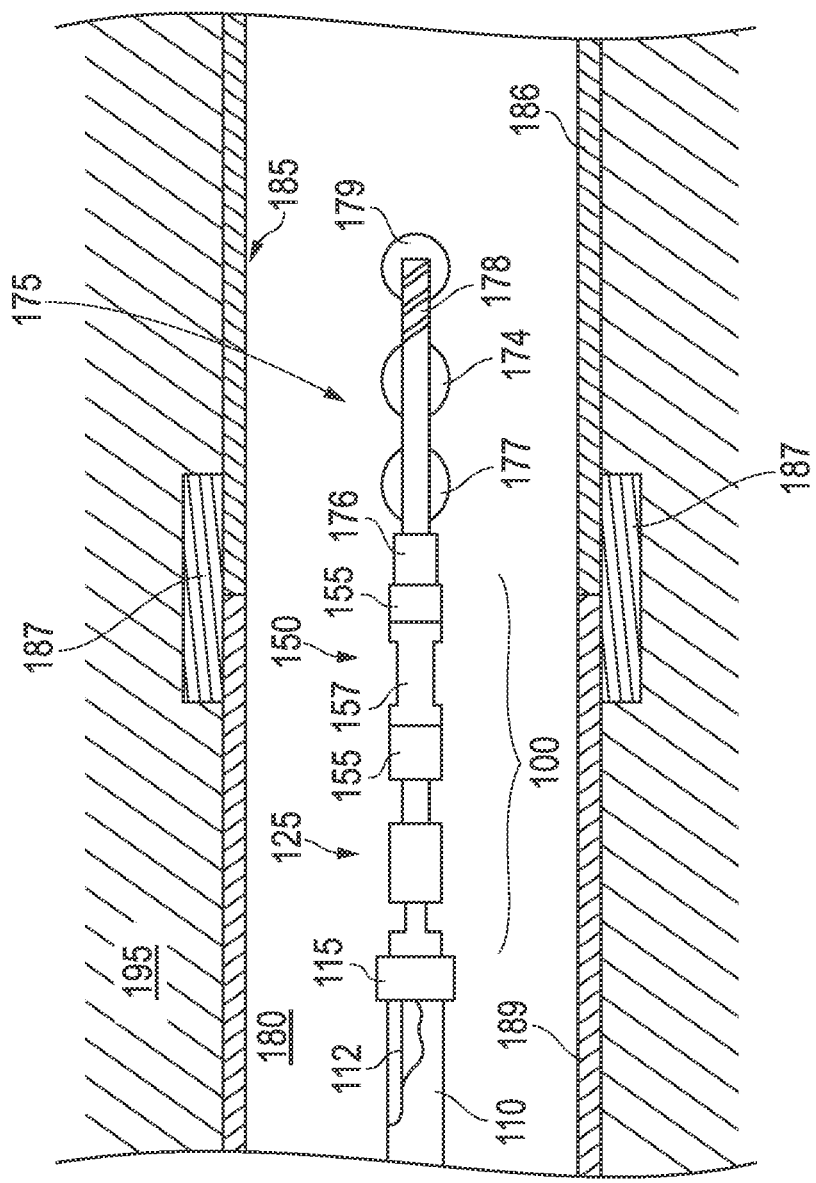

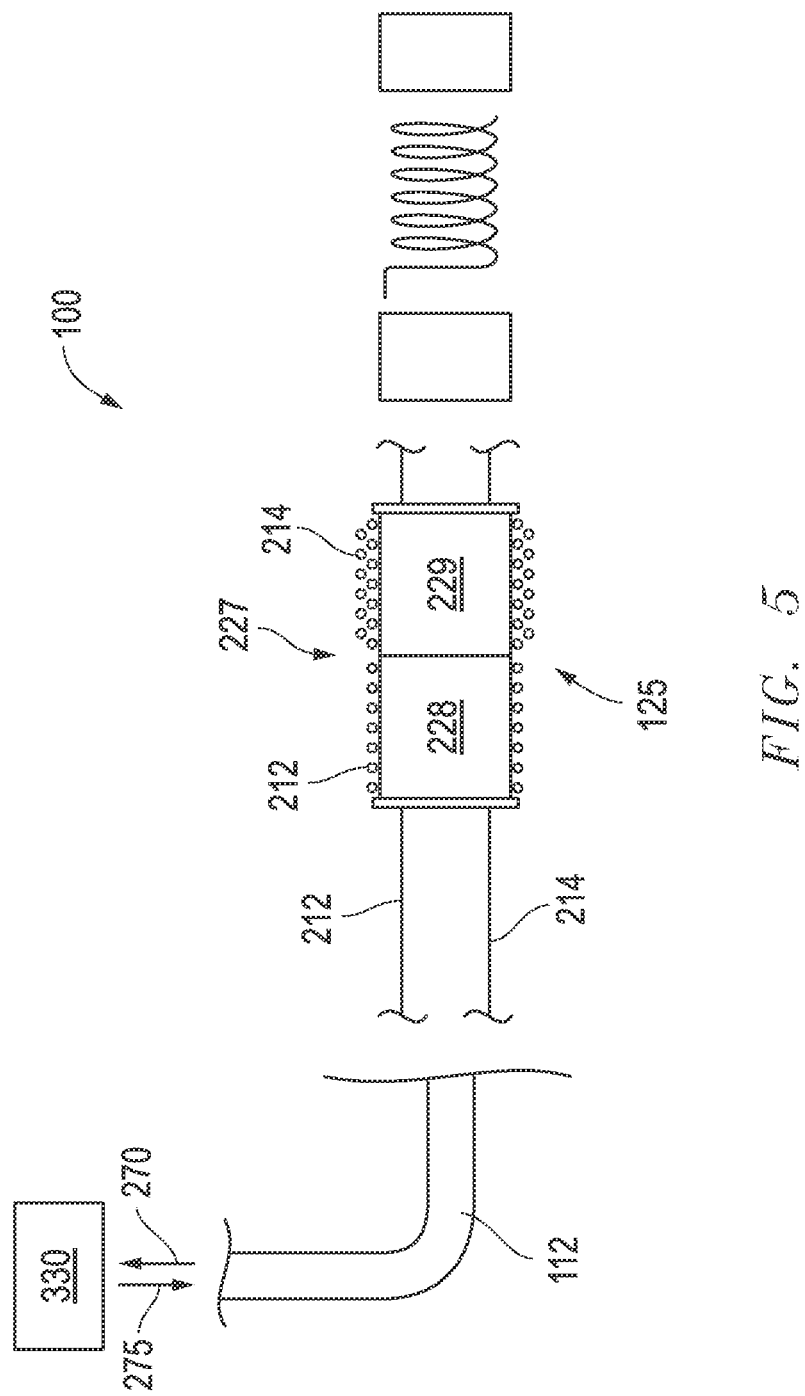

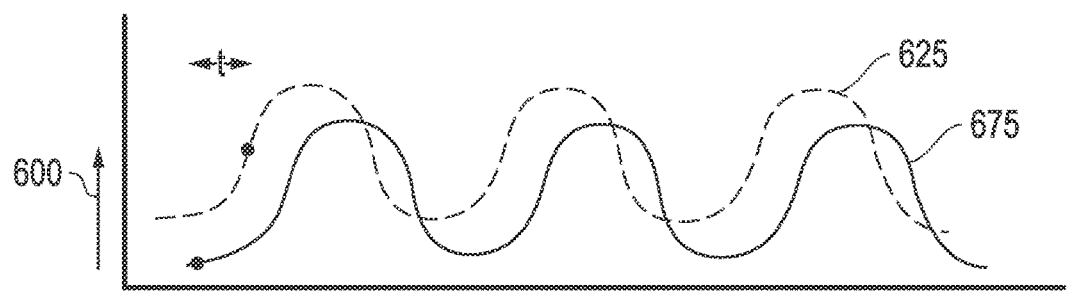
FIG. 6A
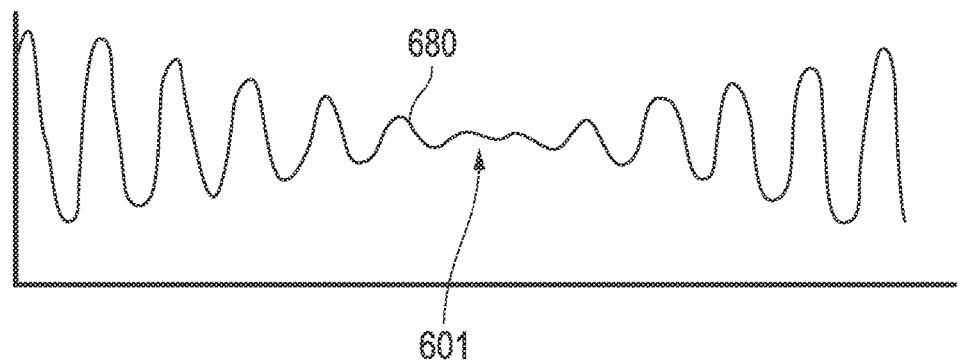
FIG. 6B
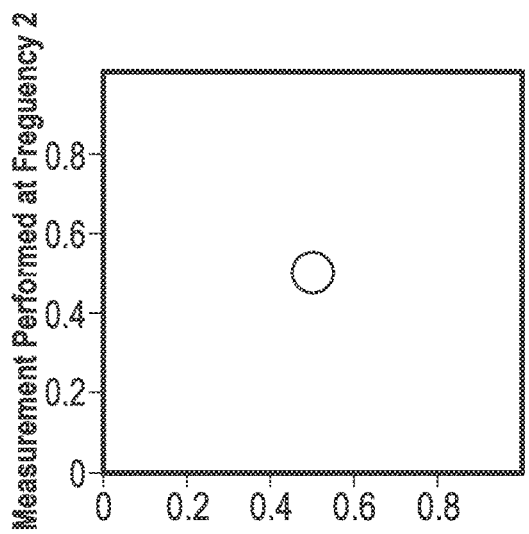 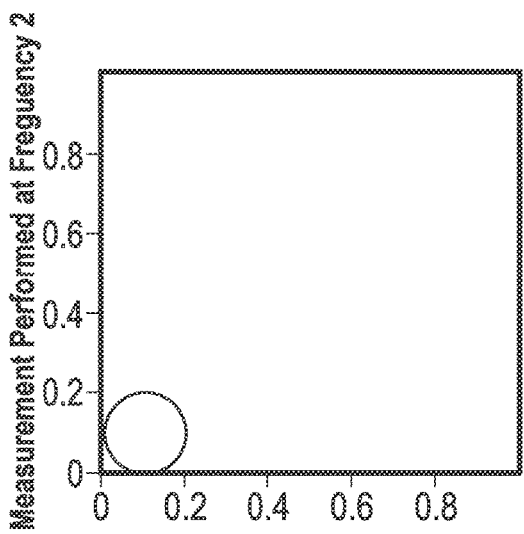
FIG. 6C  FIG. 6D

FIBER OPTIC MAGNETO-RESPONSIVE SENSOR ASSEMBLY

BACKGROUND

Exploring, drilling and completing hydrocarbon and other wells are generally complicated, time consuming and ultimately very expensive endeavors. In recognition of these expenses, added emphasis has been placed on well logging, profiling and monitoring of well conditions. Over the years, the detecting and monitoring of well conditions has become a more sophisticated and critical part of managing well operations.

Initial gathering of information relative to well and surrounding formation conditions may be obtained by running a logging tool in the well. The logging tool may be configured to acquire temperature, pressure, acidity and other well condition information. A map of the acquired information may be generated resulting in an overall profile of the well which may be of great value in servicing and maintaining the well. In order to generate an accurate profile, the true position of the tool in the well should be known throughout the logging operation. In this manner, proper correlation of acquired data and well location may be available for generating an accurate profile. Of course, even outside of a particular logging operation and profile generation, the need for accurate understanding of tool positioning within a well remains. For example, more active interventional operations such as well perforating, clean out operations, and a host of others rely on accurate downhole tool positioning.

In circumstances of cased wells, accurate downhole positioning information is often obtained by the real-time detection of casing collars. That is, cased wells generally consist of a series of largely equal length casing segments jointed to one another by casing collars. So, for example, where typical 30 foot casing segments are employed in defining the inner wall of a cased well, a casing collar may be found every 30 feet throughout the well. As such, casing collar locator tools have been developed for running in the well in conjunction with application tools such as for performing the above noted log. In this manner, casing collar detection may be acquired as the application tool is advanced through the well. Thus, accurate positioning of the application tool may be ascertained, with reference to the well tally.

Conventional casing collar locator tools include a magneto-responsive assembly that has a coil disposed between magnets within a housing. Thus, as the housing passes a casing collar, the additional metallic collar material that is magnetically sensed may translate into voltage from the coil. As such, a signal may be generated that is sent uphole and detected at the surface. In most circumstances, this type of signaling is electronically communicated over a line to the surface. Unfortunately, however, the described locator tool also requires a fairly significant power source and associated electronics in order to convert downhole collar detection into a discernable signal at the surface. Indeed, where possible and temperature permitting, the locator tool may include an associated 5-10 foot long lithium battery pack. In order to address the cumbersome, expensive and generally short-lived manner of operation for a conventional casing collar locator, efforts have been undertaken to utilize casing collar locators in conjunction with fiber-optics. In theory, the detection and signaling of casing collar information might take place without the requirement of complex power and electronics equipment as described above.

Unfortunately, sensitive fiber optic interferometry detection and signaling of casing collar information is inherently prone to providing inaccurate information as well as unreadable information. For example, while the downhole sensor assembly may be directed at casing collar detections, it is likely that a substantial amount of noise will be generated as the assembly traverses the well. This is natural regardless of the type of sensor assembly utilized. However, in the case of a fiber optic interferometer system, the detections are a collection of sampled sinusoidal data and inherently non single-valued. So, for example, where a substantial amount of noise is present near a sinusoidal trough of a waveform, accuracy is compromised due to the lack of certainty about the true position measured.

Once more, even setting noise issues aside, utilizing a fiber optic system that relies on an optical interferometer and sampled sinusoidal data also presents other issues in terms of interpreting the data collected. For example, sampling data from a sinusoidal wave means that ambiguity is presented in terms of both direction and "fringe" or cycling issues. In the case of directional ambiguity, for any given data point, there is no automatically provided indicator as to whether the measurement is on one side or the other of a given peak and moving in respectively opposite directions. Similarly, even where multiple samples of data are collected, there is no assurance that other data in between has not been missed or a "fringe hop" taken place. That is to say, if sampling is not fast enough, a circumstance may occur where data relative to an entire wave form, or multiple wave form cycles has been skipped entirely (sometimes referred to as fringe ambiguity). Furthermore, the ability to simply increase the sampling rate with surface computing faces practical bandwidth limitations, particularly in light of all the added data that is likely being picked up due to noise as noted above.

In addition to the issues above, optical systems are inherently prone to polarization fade which is a random fading or loss of signal which occurs as the state of polarization within two or more optical pathways evolve or diverge over time on a fiber optic line. This is manually correctable by an operator at surface. However, as the signal is initially lost, there is nothing available to the operator which indicates that the fading signal is due to polarization fade as opposed to a true reduction in signal from the downhole sensor assembly. Once more, efforts to address the issue in a more automatic fashion, with multiple receivers at surface, the use of Faraday mirrors, or the addition of a polarization maintaining fiber, involve significant additional complexity and expense.

To date, the feasibility of utilizing a fiber optic based casing collar locator assembly remains a challenge. Indeed, as a practical matter, due to conventional fiber optic challenges, more traditional downhole powered casing collar locators remain the primary locators of choice in the oilfield environment in spite of being more cumbersome, expensive and short-lived.

SUMMARY

A sensor assembly is provided for traversing a well. The assembly may include a magneto-responsive sensor for detecting a physical change at a wall of the well. In turn, a poled monolithic structure that is coupled to the sensor may obtain a voltage therefrom upon the detecting of the physical change and be dimensionally altered thereby. A fiber optic line that is coupled to the structure may detectably affect light passing through the line in response to the altering. Further, in one embodiment, the fiber optic line may be a multi-fiber optic line with a first fiber about a first portion of the structure and a second fiber about a second portion of the structure, each structure portion susceptible to dimensionally being altered. Additionally, these separate fibers may be of predetermined optically detectable different lengths from one another.

BRIEF DESCRIPTION OF THE DRAWINGS

FIG. 1 is a side view of an embodiment of a downhole system that utilizes a sensor assembly located between coiled tubing and a logging tool.

FIG. 5 is a schematic representation of internal components for another embodiment of the sensor assembly of FIG. 1 utilizing intentionally imbalanced optical detection.

FIG. 6A is a chart revealing information obtained by the sensor assembly of FIG. 5 where multiple waveform detections may minimize directional or fringe ambiguities.

FIGS. 6B-6D are charts revealing information obtained by the sensor assembly of FIG. 5 where multiple waveform detections may be utilized to minimize polarization fade.

DETAILED DESCRIPTION

Embodiments are described with reference to certain sensor assemblies for detection of downhole casing collars in a hydrocarbon well. Specifically, embodiments are depicted as casing collar locator assemblies for providing position information for downhole logging tools. However, a variety of configurations may be employed. For example, sensor assembly embodiments as described herein may be employed for detection of wall features in a variety of wells, pipes, or other appropriate conduits. Regardless, embodiments described herein are employed that utilize a dimensionally alterable voltage responsive device. As detailed herein, such a piezo-like device may obviate the need for coupling a separate dedicated power source to the sensor assembly. Thus, a significant amount of footspace may be saved while at the same time improving the overall temperature resistance, longevity and reliability of the assembly.

Referring now to FIG. 1, a side view of an embodiment of a downhole system that utilizes a sensor assembly 100 located between coiled tubing 110 and a logging tool 175 is shown. The system is located in a hydrocarbon well 180. Specifically, the coiled tubing 110 is utilized to forcibly delivering the sensor assembly 100 and tool 175 to the location shown. In the embodiment depicted, the application tool 175 is a passive logging tool as noted for determining a variety of well conditions. However, active tools for interventional applications may also be employed such as perforating guns and/or clean out tools. Regardless, in order to properly assess the position of any such tool 175 in conjunction with gathering of well information, the sensor assembly 100 has been provided.

Figure 3:
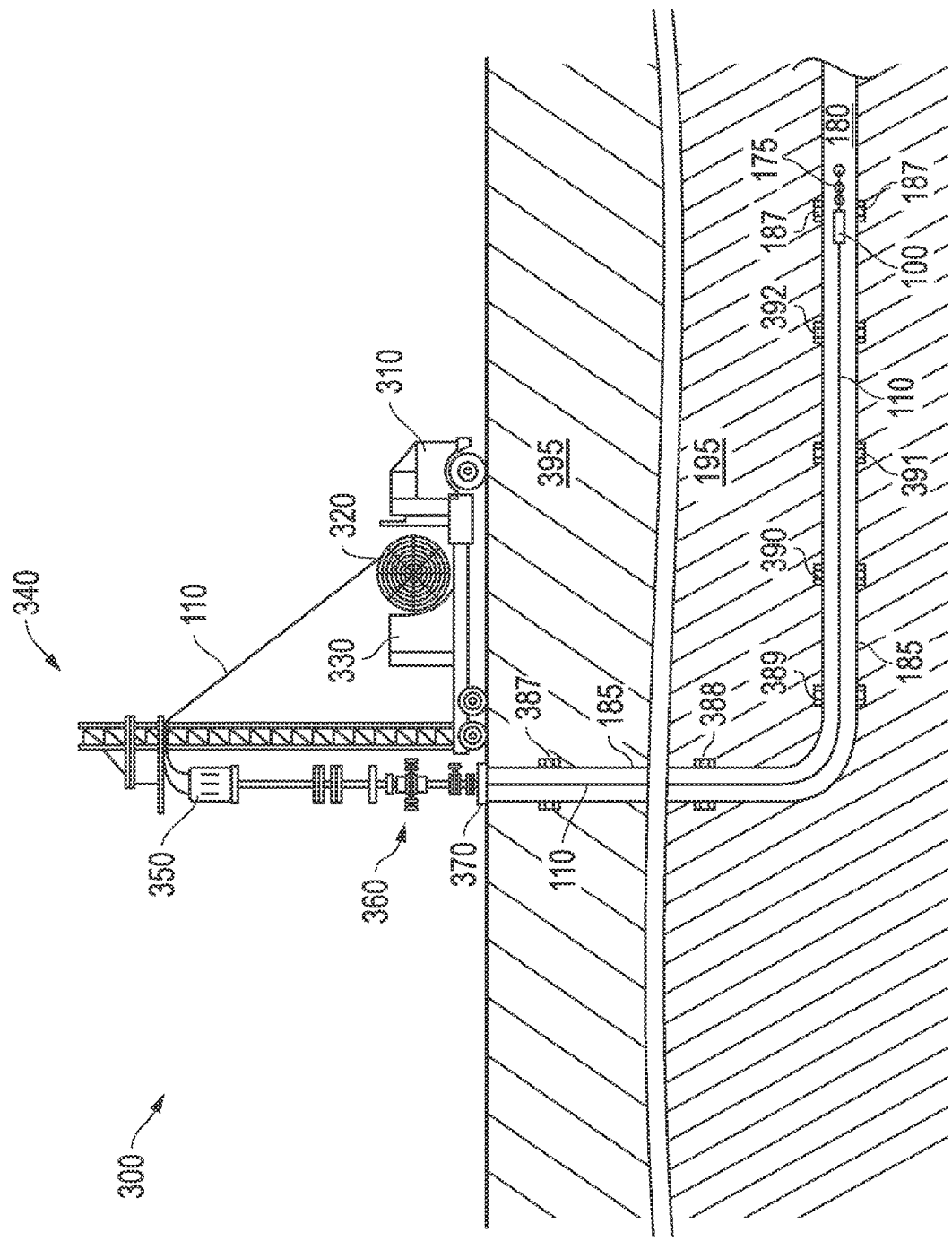
FIG. 3 is an overview of the downhole system with sensor assembly of FIG. 1 deployed in a well at an oilfield.

With brief added reference to FIG. 3, the well 180 is defined by a casing 185 running through formation layers 195, 395. The casing 185 is segmented, made up of a series of casing segments, such as the segments 186, 189 depicted in FIG. 1. As a matter of stabilization, a casing collar is threadably disposed about the interface of adjoining segments throughout the well 180. Again, such is the case with the casing collar 187 of FIG. 1 at the interface of segments 186 and 189. A host of additional casing collars 387, 388, 389, 390, 391, 392 are apparent in the overview of FIG. 3 as well.

As detailed below, the sensor assembly 100 is configured to operate without the use of significant electronics or a dedicated downhole power supply. To the contrary, the assembly 100 is equipped with a magneto-responsive sensor 150 that is configured for the passive detection of a downhole casing collar 187 at a known location. The sensor 150 in turn is coupled to a voltage responsive device 125 that is configured for signaling over a fiber optic line 112 without the requirement of a separate power source. As a result, several feet of downhole electronics and dedicated powering equipment may be left out of the assembly 100. Accordingly, the assembly 100 of the embodiment shown may be substantially less than the conventional 6-8 feet in length. Preferably, the assembly 100 is no more than about 2 feet in length. Such is made possible by the configuration of the voltage responsive device 125 as detailed further herein.

Continuing with reference to FIG. 1, the logging application tool 175 may be equipped with optically compatible measurement tools (e.g. movement detector 176, saturation implement 177, ejector implement 178, imaging device 174, fullbore spinner 179, etc.). A variety of other optically compatible diagnostic implements may also be accommodated by the tool 100 for establishing pressure, temperature, hydrocarbon states and other well conditions including surrounding formation data throughout the well 180. Regardless, the presence of the sensor assembly 100 coupled to the tool 175, allows the acquired logging data to be utilized in mapping an accurate profile of well conditions. Additionally, during the application, the acquired information may be real time in nature. Thus, real time use of such information may be employed with a degree of location accuracy. For example, where afforded by additional downhole equipment not depicted here, certain site specific interventional applications may be pursued in conjunction with the logging application. These may include the shutting off of a particularly located downhole valve or sliding sleeve, the perforating or clean out of a particular well location or a host of other active interventional applications. Whatever the case, such real time intervention may take place with a significant degree of accuracy in terms of the location in the well 180.

As indicated above, the sensor assembly 100 and application tool 175 are delivered to the depicted location via coiled tubing 110 in the embodiment shown. Downhole communication, at least with respect to the sensor assembly 100, is achieved over a fiber optic line 112. The line 112 may be a single fiber or a bundle of fiber optic fibers for communicating back and forth between the assembly 100 and surface equipment such as a control unit 330 as shown in FIG. 3. A downhole tractor or other device may also be employed to aid downhole conveyance. Additionally, other modes of delivery may be employed altogether. For example, wireline or fiber optic slickline delivery may be employed where the well 180 is substantially vertical in nature or a tractor or similar device may be provided.

Continuing with reference to FIG. 1 and as indicated above, the sensor assembly 100 itself is made up of the magneto-responsive sensor 150 which is coupled to the voltage responsive device 125. The sensor 150 includes a coil housing 157 with a magnet housing 155 disposed at either side thereof. Indeed, with brief added reference to FIG. 2B, the housings 157, 155 contain an actual coil 250 disposed between separate magnets 255. In this manner, a discernable voltage may be directed through the coil 250 as the sensor 150 passes by a casing collar 187. As detailed further below, this voltage may ultimately be employed to dimensionally affect the voltage responsive device 125 in a manner that may be detected and communicated across the fiber optic line 112 without the need for dedicated power or additional electronics. Specifically, a dimensional responsiveness of an underlying monolithic structure 227 of the device 125 to voltage from the coil 250 may affect light passing through the fiber optic line 112 in a detectable manner (see FIG. 2A). Thus, as the assembly 100 passes a casing collar 187 and is detected by the sensor 150, an indication of such detection is simultaneously communicated uphole over the line 112.

Figure 2A:
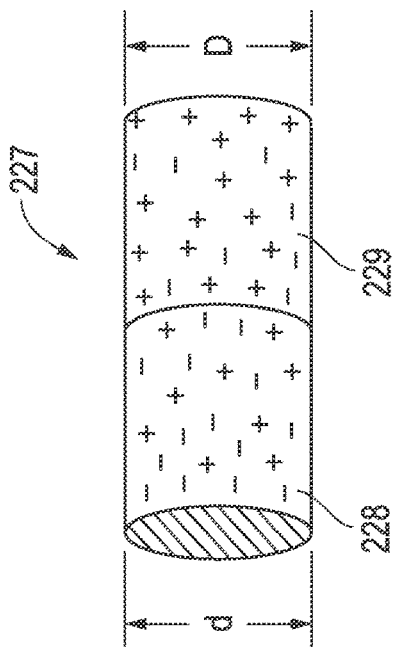
FIG. 2A is a perspective view of a single-piece voltage responsive material for incorporation into the sensor assembly of FIG. 1.

With added reference to FIG. 2A and as noted above the voltage responsive device 125 houses a single monolithic structure 227 that is poled. For example, a piezo-based ceramic material structure may be fabricated in a manner that tends to deform in a similar manner to positive charge to one end 229 thereof and negative charge toward another end 228. Use of this type of a monolithic and poled material structure 227 allows for a naturally passive manner to detect and communicate casing collar location information as distinguishable from mechanical noise. That is, the monolithic structure 227 responds as a single body to the majority of mechanical perturbation. As a result, no material differential mechanical movement is apparent as between the ends 228, 229. Thus, the monolithic structure 227 is configured to substantially eliminate mechanical pick up to low frequencies. The monolithic structure 227 may even be configured to provide mechanical resonance that would generate differential mechanical deformation and induce an optical noise at frequencies above a potential source within the spectrum of noise experience with a conventional logging application.

As detailed further below, the monolithic structure 227 of FIG. 2A is coupled to the coil 250 of FIG. 2B. Thus, a dimensional responsiveness of the monolithic structure 227 may take place as the above noted voltage moves from the coil 250 to the monolithic structure 227 when the sensor 150 moves past a casing collar 187. However, unlike natural mechanical noise from the device 125 clanging against casing segments 186, 189, temperature changes or the well environment generally, the dimensional responsiveness to voltage may be dependent upon the particular end 228, 229 of the monolithic structure 227. That is to say when the device 125 strikes a casing segment 186, 189 or other downhole feature with sufficient force to result in a dimensional or mechanical change in the device 125, this change is likely to resonate or be distributed about the entirety of the device 125. To the contrary, voltage through the poled monolithic structure 227 may lead to a markedly different behavior. For example, the voltage through the positive end 229 of the monolithic structure 227 may lead to a decrease in diameter (D) thereat. However, this same voltage may have the opposite effect on the negative end 228 of the monolithic structure 227, such that the diameter (d) there decreases just as the other diameter (D) is increasing.

Given that the two ends 228, 229 of the poled monolithic structure 227 are prone to behave differently from one another in response to the same voltage, the assembly 100 may be configured to distinguish between such a casing collar detection voltage in contrast to dimensional changes that are a result of the natural noise of the well environment. For example, with added reference to FIG. 2B, each end 228, 229 of the structure may be surrounded by a different set of individual fibers 212, 214. Thus, as fiber optic detections from each end 228, 229 of the monolithic structure 227 are recorded, a differential may actually be computed. Stated differently, a processor (e.g. at the control unit 330 of FIG. 3) may discard noise by setting aside detections that do not indicate such a differential. That is to say detections that fail to involve the ends 228, 229 dimensionally behaving opposite from one another are likely mechanical in nature and may be discarded. Instead, casing collar location may be reliant on the presence of a differential, where one end 228 changes in diameter (d) (e.g. growing) and the other 229 changes in the opposite manner (e.g. shrinking in diameter (D)).

Referring specifically now to FIG. 2A, a perspective view of a single-piece voltage responsive monolithic structure 227 for incorporation into the sensor assembly 125 of FIG. 1 is shown. Ceramics such as lead zirconate or other suitable voltage responsive materials may be employed as the piezo-material monolithic structure 227, typically chosen for a combination of mechanical, electro-mechanical and thermal properties. Additionally, as described above, the monolithic structure 227 is poled and largely positive at one end 229 and negative at the other 228. Ultimately, as also described above, this allows for common mode noise in the form of natural downhole mechanical and acoustic vibrations to be largely discounted as fiber optic sampling takes place. That is, natural deformations that reverberate roughly throughout the monolithic structure 227 are discounted, whereas deformations such as changes in diameter (D or d) that are opposite one another may provide a differential that is accounted for in establishing casing collar locations. The elimination of common mode noise in this manner enhances the practicality of utilizing a highly sensitive interferometer for fiber optic operations. For example, in the case of a high speed well-logging application where a large amount of noise is to be expected, limiting detections of consequence to those in which a predetermined differential is established, allows for practical, cost effective computations to take place at surface for sake of casing collar locating.

Figure 2B:
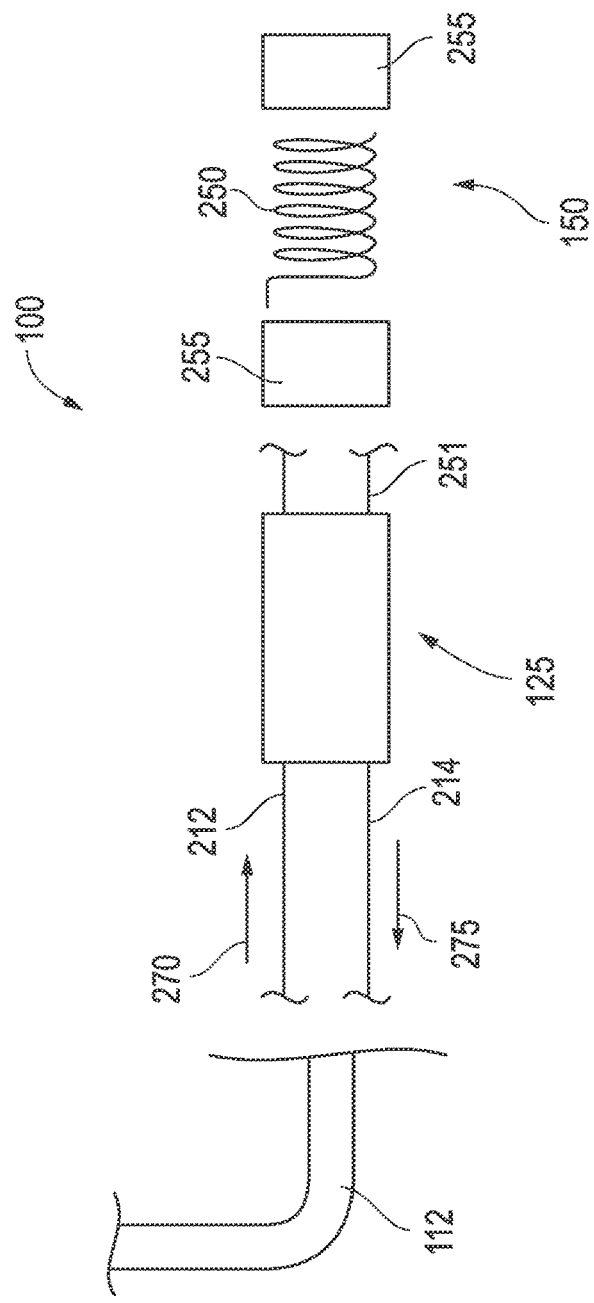
FIG. 2B is a schematic representation of internal components for the sensor assembly of FIG. 1 coupled to a fiber optic line through the coiled tubing.

Referring now to FIG. 2B with added reference to FIG. 2A, a schematic representation of the sensor assembly 100 is shown. In this view, the mechanics of the assembly 100 are detailed. Namely, the voltage responsive or 'piezo' monolithic structure 227 of the voltage responsive device 125 is depicted as in contact with a coil extension 251 emanating from a coil 250 of the magneto-responsive sensor 150. As noted above, magnetically induced voltage through the coil 250 from the magnets 255 of the sensor 150 may be translated into dimensional changes in the monolithic structure 227 of the device 125.

In practical terms, with reference to the embodiments depicted, voltage may be delivered by the coil 250 (via the extension 251 thereof) to the piezo-material 227 as a casing collar 187 such as that of FIG. 1 is detected by the sensor 150. This voltage may be up to a few volts. Preferably about a volt will more than suffice in a system as shown where a balance is sought between the electrical coil responsivity, magnetic fields, interferometer sensitivity, and the dynamic range of the optics in response to the voltage multiplied by the bandwidth requirements (for example, in light of logging speed). Regardless, as a result of such imparted voltage, the monolithic material structure 227 may expand (or contract, depending on the electrical architecture employed between the coil 250 and the monolithic structure 227). More specifically, each end 228, 229 may behave in a dimensionally opposite manner in this regard as detailed above.

Continuing with reference to FIGS. 2A and 2B, one embodiment of the monolithic structure 227 of the device 125 may be of a truly cylindrical configuration as shown. In such an embodiment, the monolithic structure 227 may be 10-50 mm in outer diameter, preferably about 40 mm, without exposure to voltage. However, once a casing collar 187 (see FIG. 1) is detected, the voltage imparted on the monolithic structure 227 may alter the outer diameter (d and/or D) by a distinguishable amount as detailed further below, say 1-3 nanometers. Thus, given that the monolithic structure 227 is firmly wrapped by fiber optic fibers 212, 214 of the line 112, the dimensional changes in the structure 127 may result in an optically detectable stretching or contracting of the fibers 212, 214 as the case may be. As a result, light that is transmitted downhole or returned (see arrows 270, 275) over the downhole fibers 212, 214 of the line 112 may be altered (i.e. phase shifted).

Given that the dimensions of a monolithic structure 227 are known ahead of time, the dimensional change upon a voltage imparted to the monolithic piezo-structure 227, may be correlated directly with a phase shift change in light. For example, with a conventional diode or other laser light source employed at surface through the fiber optic line 112 of FIG. 1, a downhole path of light (see arrow 270) of a given wavelength is generated. As detailed above, this light may pass through fibers 212, 214 that are wrapped about the dimensionally responsive monolithic piezo-structure 227 and reflected back uphole (see arrow 275). However, this return light may be phase shifted, resulting in a signal dependent interferometric signal.

Computations may be performed by the control unit 330 of FIG. 3 which may employ conventional algorithms which correlate the resultant intensity modulation to the dimensional changes in the fibers 212, 214 and the overall monolithic structure 227, as a function of time, thereby verifying collar detection. For instance, in one such example, the fibers 212, 214 may be comparatively flexible relative to the underlying monolithic piezo-structure 227. Thus, they may be presumed to have substantially no effect on expansion of the monolithic structure 227. Of course, this is ultimately a matter of design choice. For example, in one embodiment the fiber stiffness may be about 10% of the piezo stiffness to attain such a result. Regardless, depending on such factors and the particular material type selected for the monolithic piezo-structure 227, an expected displacement reduction of between about 5-7% may be exhibited by the fibers 212, 214 upon collar detection (e.g. as compared to a free piece of piezo-ceramic material). At the same time, however, dimensional changes that reflect no substantial differential between the ends 228, 229 of the monolithic structure 227 may be discarded as noise. With such data pre-stored at the control unit 330 along with detail regarding the interferometer utilized in sending the optical signal back uphole (see arrow 275), conventional calculations may be performed employing such data so as to verify collar detection with a degree of certainty while largely eliminating common mode noise. Once more, just as with the return signal itself, all of these calculations take place without the requirement of dedicated electronic equipment disposed at the sensor assembly 100.

Additionally, such real-time verification may allow for the control unit to make application modifications in real-time (e.g. speed adjustments).

Where a conventional interferometer is employed to reflect the above-noted light back uphole (e.g. arrow 275), the change in the light may be detected and accounted for at surface. In one embodiment, the interferometer is a 10-15 m interferometer coupled directly to a location of the voltage responsive device 125. Additionally, the noted accounting of uphole light may take place at the control unit 330 described above (see FIG. 3). All in all, casing collar detection of this nature may be enhanced in terms of downhole tool positioning accuracy. Further, given the unique nature of the poled monolithic structure 227 and focus on differential measurements, common mode noise may be substantially eliminated. Additionally, in the schematic of FIG. 2B, a single voltage responsive device 125 is utilized. However, in other embodiments additional voltage responsive devices may be utilized in series for sake of magnifying the detections.

Referring now to FIG. 3, with added reference to FIG. 1, an overview of the downhole system is shown with the sensor assembly 100 of FIG. 1 deployed in the well 180 at an oilfield 300. The well 180 is defined by a casing 185 running through formation layers 195, 395. The casing 185 is made up of a series of casing segments, such as the segments 186, 189 depicted in FIG. 1. As a matter of stabilization, a casing collar is threadably disposed about the interface of adjoining segments throughout the well 180. Again, such is the case with the casing collar 187 of FIG. 1 at the interface of segments 186 and 189. A host of additional casing collars 387, 388, 389, 390, 391, 392 are apparent in the overview of FIG. 3 as well.

With particular reference to FIG. 3 and the above architecture in mind, each casing collar 387, 388, 389, 390, 391, 392, 187 may be distanced from an adjacent collar by a known distance. For example, a conventional casing 185 for a hydrocarbon well 180 is generally available in 20-40 foot segments 186, 189 (more specifically, about 30 feet each). Thus, a known separation of 30 feet exists between adjacent collars 387, 388, 389, 390, 391, 392, 187 which may be accounted for as the assembly 100 is advanced through the well 180.

As depicted in FIG. 3, the assembly 100 is shown delivered by way of coiled tubing 110 from a coiled tubing truck 310 at the surface of an oilfield 300. More specifically, the truck 310 accommodates a coiled tubing reel 320 and control unit 330 which may be used to mobily deploy and regulate the delivery of the coiled tubing 110 through a rig 340 and other surface equipment as depicted. As described above, the control unit 330 in particular may make use of the known distance between casing collars 387, 388, 389, 390, 391, 392, 187 so as to enhance the accuracy and reliability of the depicted logging application. It is also worth noting that the sensor assembly 100 is up to 30,000 feet or more from the surface of the oilfield 300 and yet fiber optic communication is reliably achieved without the requirement of dedicated power and/or electronics. As such, concern over damage to such electrical components, for example, due to the harshness of the well environment or the delivery application itself, is entirely avoided.

Continuing with reference to FIG. 3, the coiled tubing 110 is threaded through a gooseneck injector 350 and directed toward an assembly of pressure regulation and control valves 360 often referred to as a 'Christmas Tree'. From there the coiled tubing 110 is directed through the well head 370 and through various formation layers 395, 195 and to the location shown.

As the coiled tubing 110 is advanced, the above described control unit 330 may be configured to acquire information from the assembly 100 and application tool 175. Additionally, information such as the known distance between casing collars 387, 388, 389, 390, 391, 392, 187 may be pre-stored on the unit 330 so as to ascertain the location of the assembly 100. As such, more accurate positioning of the assembly 100 may be realized in real time. Accordingly, the application may proceed with a greater degree of accuracy and, for the logging application of FIGS. 1 and 3, a more accurate profile of the well 180 may be developed.

Figure 4:
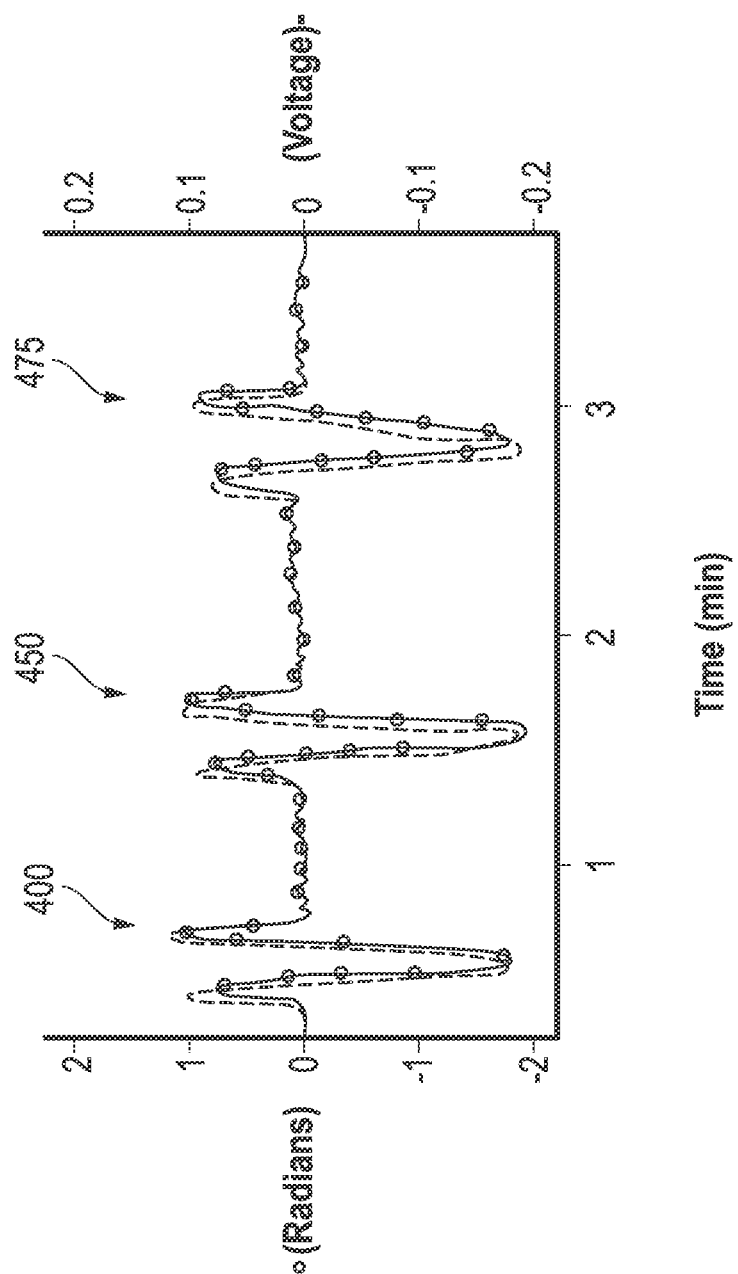
FIG. 4 is a chart revealing information obtained by the sensor assembly of FIG. 1 as it is passed through the well of FIG. 3.

Referring now to FIG. 4, with added reference to FIGS. 1-3, a chart is shown summarizing the results of employing an embodiment of a sensor assembly 100 as it is passed through the well 180 of FIG. 3. The chart depicts sensor related activity over the course of several seconds. For example, as the sensor assembly 100 is advanced downhole within the well 180, a host of casing collar detections 400, 450, 475 may be made. In the example depicted, casing collars 387, 388, 389, 390, 391, 392, 187 may be distanced from one another by a standard 30 feet or so. Thus, with a detection 400, 450, 475 taking place about once a second, it is apparent that downhole advancement speed of the sensor assembly 100 is occurring at about 30 feet per second.

The chart of FIG. 4 specifically reveals the computed differential of dimensional change for the voltage responsive monolithic structure 227 of FIG. 2A, represented in radians (o) as the assembly 100 passes a series of casing collars 387, 388, 389, 390, 391, 392, 187. The chart also reveals the voltage (-) that is imparted to the monolithic piezo-structure 227 over this same period of time. With such representations of differential radians (o) and voltage (-) overlaid on the same chart as in FIG. 4, the direct correlation between the voltage (-) and radians (o) is immediately apparent. Indeed, even within the detections 400, 450, 475 themselves, the dimensional expansion and contraction of the monolithic piezo-structure 227 follows the change in voltage (-). That is, as the magneto-responsive sensor 150 approaches a casing collar 187, a small spike may present, followed by a significant voltage detection dip and eventually another small spike as the sensor 150 continues to move away from the collar 187. Additionally, throughout such a detection period, the differential dimensional change (in radians (o)) very closely tracks the voltage as is apparent on the chart.

With the degree of correlation between voltage (-) and dimensional change of the monolithic structure 227 as noted above, the reliability of the assembly 100 is apparent. Indeed, the reliability of utilizing a relatively passive generation of voltage to trigger a dimensional change that may ultimately actuate uphole signaling is confirmed. That is to say, without the employment of any dedicated downhole power source or electronics for the assembly 100, the unique combination of a magneto-responsive sensor 150, voltage responsive device 125 and fiber optic line 112, may provide significantly accurate real time collar detection. Such a combination not only eliminates the requirement of separate dedicated power and electronics, but the combination is one that is solid state in nature. That is, no moving or adjustable parts are required in implementation.

Referring now to FIG. 5, a schematic representation of internal components for another embodiment of the sensor assembly 100 of FIG. 1 is shown. In this embodiment, intentionally imbalanced optical detection is utilized so as to reduce natural ambiguities or fade that may take place over the course of optical detections. Specifically, fibers 212, 214 of the optic line 112 running to the oilfield surface disproportionately interface the monolithic poled structure 227 of the voltage responsive device 125.

In the embodiment shown, one of the optical fibers 214 is intentionally a bit longer than the other 212. This may be a difference of between about 0.5-50 cm of added fiber length to the longer fiber 214 as compared to the shorter fiber 212. This may result in the longer fiber being wrapped around the positive end 229 of the monolithic structure 227 more than the shorter fiber 212 is wrapped around the negative end 228 of the monolithic structure 227. Of course, as noted below, different arrangements and orientations may be utilized. For example, in one embodiment, the fibers 212, 214 may be placed in different arms of a two-path interferometer to allow for sensitivity to changes in the differential length between the fibers 212, 214. Regardless, as long as the fibers 212, 214 are of detectably different lengths, optical responsiveness to changes in the dimensions of the monolithic structure 227 at each end 228, 229 will be pronounced.

In addition to the fibers 212, 214 being of detectably different, but close, lengths, separate predetermined frequencies, perhaps within about 100 MHz-2 GHz of one another, may be transmitted over each fiber 212, 214 of the line 112. With added reference to FIG. 6A below, sampling of the frequencies 625, 675 is substantially or near simultaneous with respect to the location of the waveforms and occurring at the same sampling rate. As shown in FIG. 6A, due to the phase shift this may actually involve sampling that takes place with a slight offset as between the measured frequencies 625, 675 (e.g. note the delay for a period of time (t), perhaps, by a microsecond for one frequency 675, as compared to the other 625). Thus, a chart of multiple closely associated waveforms 625, 675 may be generated which is usable for eliminating ambiguities as described further below.

Of course, in addition to the embodiment of FIG. 5, a variety of different orientations and architecture may be used to construct an intentional optical imbalance. For example, the longer fiber 214 may instead be wrapped about the negative end 228 of the monolithic structure 227. Either way, laser light transmitted downhole (275) by the control unit 330 or the return light (270) detected and analyzed by the unit 330 may be parsed into separate analysis of closely associated waveforms 625, 675 as shown in FIG. 6A and described further below. Additionally, construction of such an interferometer system with fibers 212, 214 of slightly different lengths may be of improved manufacturability due to flexibility in required tolerances. That is to say, unlike a system which might require an imperceptible difference in lengths of the fibers 212, 214, in the system described here, a 1-3 cm difference or more may be allowed. Further, there is no requirement that the true difference in length be precisely established prior to construction. Rather, the system may be assembled off site according to a standard protocol that aims for a 1-3 cm difference in fiber length, with some flexibility in tolerance that may be compensated using the control unit 330 at surface. Subsequently, at the outset of operations, the acquisition system at the control unit 330 may be tuned to the sensing head of the voltage responsive device 125 on site. That is, there is no need to store predetermined imbalance information at the control unit 330 in order to effectively utilize a system with such an imbalance. In fact, the entire system may be re-tuned in the same manner as the fiber lengths change over time and use in the real world environment.

Referring now to FIG. 6A, a chart is shown revealing information obtained by the sensor assembly 100 of FIG. 5 where multiple waveforms 625, 675 may minimize directional or fringe ambiguities. For example, upon review of the chart, a first waveform is apparent 625 at one frequency whereas a second waveform 675 is also shown at another frequency. This is a practical result that is attainable when utilizing an intentionally imbalanced interferometer system as described above. The frequencies are close to one another, perhaps separated by no more than 1-2 GHz of a shift as noted above.

As illustrated by the chart of FIG. 6A, the use of multiple offset waveforms in this manner helps eliminate directional ambiguity. For example, where data is initially sampled from a single waveform (e.g. 675), the system is blind as to where on the waveform, the sample might be located. More specifically, directional ambiguity is present in that it is not known whether the sampled data is from the top of a waveform 675, the bottom, somewhere in-between or even at a location of significant noise. Thus, the sampled data fails to initially provide any directional information. However, with a slightly shifted additional waveform 625 present, a single quasi-static sampling thereof may take place (e.g. delayed in time (t) by only about 1-1,000 microseconds from the sampling of the other waveform 675). Now, as a result of just these two samples, directional ambiguity is eliminated. Indeed, with respect to the example shown, an upward direction (arrow 600) is apparent moving from the one sample (from 675) to the next (from 625 a microsecond later). Ultimately, in this manner, the use of two closely associated waveforms 625, 675 in this manner has eliminated directional ambiguity.

FIGS. 6B-6D are charts revealing information obtained by the sensor assembly of FIG. 5 where multiple waveform detections may be utilized to minimize polarization fade. Specifically, FIG. 6B is a depiction of a waveform 680 which undergoes a natural polarization fade as indicated at 601. That is, even where the returned light or sampling rate of a waveform are not in question, it remains a natural phenomenon of interferometer systems that periodically and seemingly randomly, the visibility of a signal may begin to diminish for a period. This is referred to as polarization fade which naturally evolves where one light path becomes orthogonal to the other to a degree that interference (i.e. visibility) stops. This is readily correctable at surface where control over the path of light originates. However, at the outset of a polarization fade, the operator is not able to distinguish this from an unresponsive sensor at the control unit or perhaps a true loss of signal from downhole. However, as detailed below, the simultaneous use of multiple closely associated waveforms allows the operator to accurately identify and correct polarization fade.

Referring now to FIG. 6C, multiple signals of slightly different frequencies, such as the waveforms 625, 675 of FIG. 6A are now plotted against one another in the form of an ellipse. In a circumstance where no polarization fade is present and the interferometer is properly adjusted, the ellipse would be touching and emerge from both axes. That is, the arms or light paths would be at 90° with maximum interference and visibility. However, as depicted in FIG. 6B, the ellipse is not only of a size to indicate a reduced amount of signal, it is also displaced from both axes. Thus, the operator is immediately alerted to a circumstance of polarization fade and not merely a reduction in signal. Indeed, as depicted in FIG. 6D, the operator has taken corrective action at surface, through direction of the laser light being emitted, and the visibility of the signal is returned (i.e. with the ellipse intersecting both axes). The ability to identify and distinguish this fade from a general loss of signal is rendered possible by the utilization of two closely associated waveforms of slightly different frequencies as detailed hereinabove. Indeed, this determination may be made by the operator or in an automated fashion.

Figure 7:
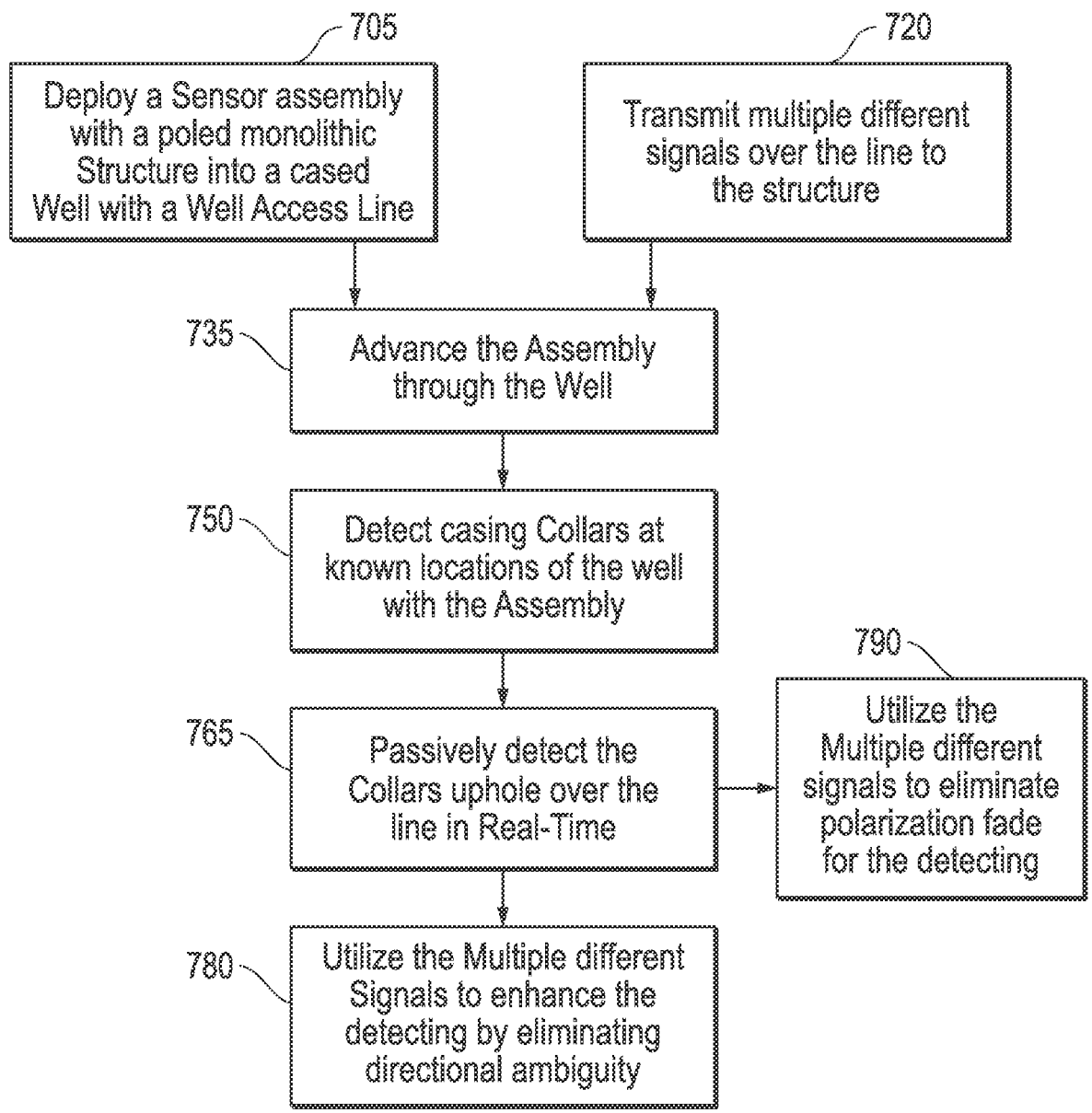
FIG. 7 is a flow-chart summarizing an embodiment of employing sensor assemblies such as those schematically represented in FIG. 2B or FIG. 5.

Referring now to FIG. 7, a flow-chart summarizing an embodiment of employing sensor assemblies such as those schematically represented in FIG. 2B or FIG. 5 is shown. Such an assembly may be deployed into a well as indicated at 705 and outfitted with a poled monolithic structure and even capable of carrying multiple different transmitted signals (see 720). Thus, as the assembly is advanced through the well it may detect casing collars at known locations as indicated at 735 and 750. Further, as noted at 765, passive detection of the collars may take place uphole and in real-time.

Embodiments of the assembly may utilize the multiple different signals that are transmitted to enhance the above indicated detections of the collars. For example, the availability of multiple different signals may be utilized to eliminate polarization fade as indicated at 795 so as to ensure ongoing detection of the signals. Further, as noted at 780, directional ambiguity may also be eliminated.

Embodiments described hereinabove include a system and methods that take advantage of fiber optics to reduce overall equipment, footprint and power requirements in a casing collar locator. Once more the system and techniques dramatically minimize noise through incorporation of a unique monolithic poled structure. Furthermore, an intentional imbalance may be built into the system for tracking of multiple wavelength signals in a manner that minimizes fringe ambiguity while also alerting an operator to polarization fade. Thus, the feasibility of utilizing a fiber optic system for casing collar locating is dramatically enhanced.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, the availability of multiple wavelengths over the same system as detailed may be utilized to minimize the effects of noise. Furthermore, the foregoing description should not be read as pertaining only to the precise structures described and shown in the accompanying drawings, but rather should be read as consistent with and as support for the following claims, which are to have their fullest and fairest scope.

We claim:

1. A sensor assembly for traversing a well, the assembly comprising:
    a magneto-responsive sensor for detecting a physical change at a wall of the well;
    a poled monolithic structure coupled to the sensor for obtaining a voltage therefrom upon the detecting of the physical change, the obtaining for dimensionally altering the structure; and
    a fiber optic line coupled to the structure for detectably affecting light passing through the line upon the altering of the structure, wherein the poled monolithic structure comprises a substantially positive end and a substantially negative end, the dimensional altering of the structure to increase a diameter of one of the ends and to decrease a diameter of the other of the ends.

2. The sensor assembly of claim 1 wherein the poled monolithic structure is comprised of one of a piezo-based material, a ceramic, and lead zirconate.

3. The sensor assembly of claim 1 wherein the poled monolithic structure is of a cylindrical form having an outer diameter of between about 10 mm and about 50 mm.

4. The sensor assembly of claim 1 wherein the poled monolithic structure is a first structure, the assembly further comprising a second poled monolithic structure coupled to the first in series.

5. The sensor assembly of claim 1 wherein the well is a hydrocarbon well, the physical change is a casing collar, and the assembly is a casing collar locator of less than about 2 feet in length.

6. The sensor assembly of claim 1 wherein the fiber optic line is a single optical fiber.

7. The sensor assembly of claim 1 wherein the fiber optic line comprises a plurality of optical fibers.

8. The sensor assembly of claim 1 wherein the fiber optic line comprises a plurality of optical fibers and wherein the ends of the poled monolithic structure are surrounded by different optical fibers of the plurality of optical fibers.

9. A method of passively monitoring a location of a downhole assembly moving through a well via casing collar detection, the method comprising:
- transmitting light over a fiber optic line to a poled monolithic structure of the assembly during the moving thereof through the well;
- utilizing a magneto-responsive sensor of the assembly to generate voltage as the assembly passes a casing collar at a known location in the well;
- obtaining the voltage at a first portion of the poled monolithic structure to increase a diameter thereof;
- obtaining the voltage at a second portion of the poled monolithic structure to decrease a diameter thereof;
- relaying light from each of the increased diameter and decreased diameter ends of the poled monolithic structure over the fiber optic line; and
- calculating a differential of the diameters to confirm casing collar detection by the assembly.

10. The method of claim 9 wherein the calculating of the differential to confirm the detection substantially eliminates one of optical, acoustic and mechanical common mode noise.

11. The method of claim 9 further comprising performing an application in the well with a tool of the assembly based on the known location of the detected casing collar.

12. The method of claim 11 further comprising adjusting one of the moving of the assembly through the well and the well application in real time based on the known location of the detected casing collar.

13. The method of claim 9 further comprising providing the poled monolithic structure with a cylindrical form.

14. The method of claim 9 wherein calculating comprises directly correlating a dimensional change, due to the change in diameters, with a phase shift change of the light.

* * * * *